United States Patent [19]
Whitman et al.

[11] Patent Number: 5,631,500
[45] Date of Patent: May 20, 1997

[54] DEVICE THAT WILL ACTIVATE THE HEADLIGHTS AND TAILLIGHTS ONCE THE WINDSHIELD WIPER MOTOR IS SWITCHED ON

[76] Inventors: John B. Whitman, Rte. 3, Box 5300, Crawfordville, Fla. 32327; Chalmers A. Pritchard, deceased, late of Tallahassee, Fla.; by Brandee Crutchfield, legal representative, Rte. 5 Box 2505, Tallahassee, Fla. 32311

[21] Appl. No.: 406,679

[22] Filed: Mar. 17, 1995

Related U.S. Application Data

[63] Continuation of Ser. No. 96,888, Jul. 26, 1993, abandoned.
[51] Int. Cl.⁶ .......................... H05B 37/00; B60Q 1/076
[52] U.S. Cl. .......................... 307/10.1; 307/10.8; 315/77; 315/82; 315/83
[58] Field of Search .......................... 307/9.1, 10.1, 307/10.8; 315/77, 82, 83; 318/DIG. 2

[56] References Cited

U.S. PATENT DOCUMENTS 3,519,837  7/1970  Nolin et al. .......................... 315/82
5,231,331  7/1993  Meister .......................... 307/10.8

*Primary Examiner*—William M. Shoop, Jr.
*Assistant Examiner*—Peter Ganjoo
*Attorney, Agent, or Firm*—Carnes, Cona & Dixon

[57] ABSTRACT

An electrical system is provided in a motor vehicle to activate the headlights and taillights once the windshield wipers have been switched on. The electrical system also provides for the headlights and taillights to be deactivated once the ignition switch is off. At least one relay is placed between the windshield wiper switch and the headlights and taillights. A current entering the relays from the initiation of the windshield wiper switch, induces a magnetic field across the inductor, closing the switches within the relays, thus illuminating the lights. If two relays are used, then the second relay maintains the activation of the headlights and taillights if the windshield wiper switch is deactivated. If the lights (headlights and taillights) are not desired then a push button switch can deactivate the lights.

17 Claims, 6 Drawing Sheets

DEVICE THAT WILL ACTIVATE THE HEADLIGHTS AND TAILLIGHTS ONCE THE WINDSHIELD WIPER MOTOR IS SWITCHED ON

This is a continuation of application Ser. No. 08/096,888, filed Jul. 26, 1993, now abandoned.

BACKGROUND OF THE INVENTION

In recent years, several states have been regulating laws to ensure the safety of drivers and passengers in automobiles during hazardous weather conditions. One such law requires the operation of headlights during inclement weather. When the severity of the weather warrants the use of windshield wipers, the headlights must also be turned on. During these conditions, while the windshield wipers are in use, many vehicle operators neglect to turn on the headlights and taillights. Some of the vehicle operators who do remember to switch on the lights neglect to switch them off once the vehicle's ignition has been switched off. This may lead to a voltage drain in the electrical system.

Many devices have been fabricated to eliminate the problem of activating headlights and taillights while windshield wipers are in operation. These devices provide that during the operation of the windshield wipers, the lights will be turned on simultaneously. However, to accomplish this, several components must be installed. Such additional components increase the production and installation expense, as well as increase the possibility of component failure.

None of these previous efforts, however, provide the benefits intended with the present invention. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides for a safety device that can be installed into a vehicle's existing electrical circuit in order to ensure the operation of the headlights and taillights once the windshield wipers have been activated. The safety device also allows for the headlights and taillights to be switched off once the ignition is deactivated. Additionally, the safety device of the present invention further provides for the option of leaving the headlights and taillights on once the windshield wipers have been deactivated. In order to accomplish these tasks, the safety device of the present invention is plugged into the exiting plug of the lights (headlights and taillights) and is electrically connected to the windshield wiper switch and the windshield wiper motor.

The safety device of the present invention consists of the use of one molded relay assembly or two molded relay assemblies. Each relay assembly includes a switch and a coil. The relay assembly or relay assemblies are electrically and mechanically connect to a plug. The plug has a male extending end and a female receiving end. The plug provides for an easy means for installing the safety device of the present invention into the existing plugs for the lights of a motor vehicle.

Activation of the safety device occurs once the windshield wiper switch is activated. This will provide for an electrical current to be supplied to the relay assembly or to one of the two relay assemblies. This current causes a magnetic field to be induced at the coil, which closes the switch and causes an activation of headlights and taillights. Due to the unique configuration and location of the safety device, if the safety relays malfunctions, the windshield wiper and lights would still operate in a normal manner.

Accordingly, it is the object of the present invention to provide for a simple and inexpensive safety device that will activate the headlights and taillights once the windshield wipers are energized.

It is yet another object of the present invention to provide for a device that will provide the option of maintaining or deactivating the headlights and taillights once the windshield wipers have been switched off.

Still another object of the present invention to provide for a safety device that will deactivate the headlights and taillights once the ignition is switched off.

A further object of the present invention to provide for a safety device that is easy to installed or retrofitted into the existing electrical system of any type or model motor vehicle.

A final object of the present invention, to be specifically enumerated herein, is to provide a snake device in accordance with the preceding objects and which will conform to conventional forms of manufacture, be of simple construction and easy to use so as to provide a device that would be economically feasible, long lasting and relatively trouble free in operation.

Although there have been a few inventions related to a wiper activation systems, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

DESCRIPTION OF THE PREFERRED EMBODIMENTS

Figure 1:
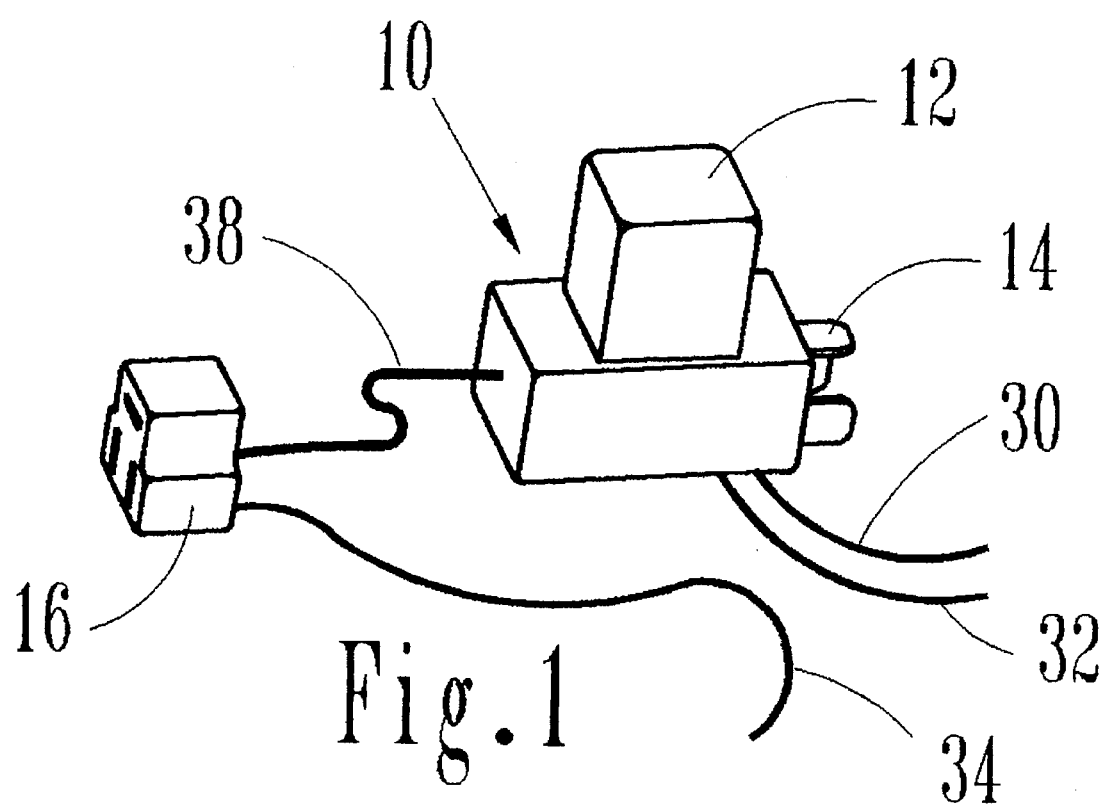
FIG. 1 is a perspective view of the first embodiment of the safety device of the present invention.
Figure 2:
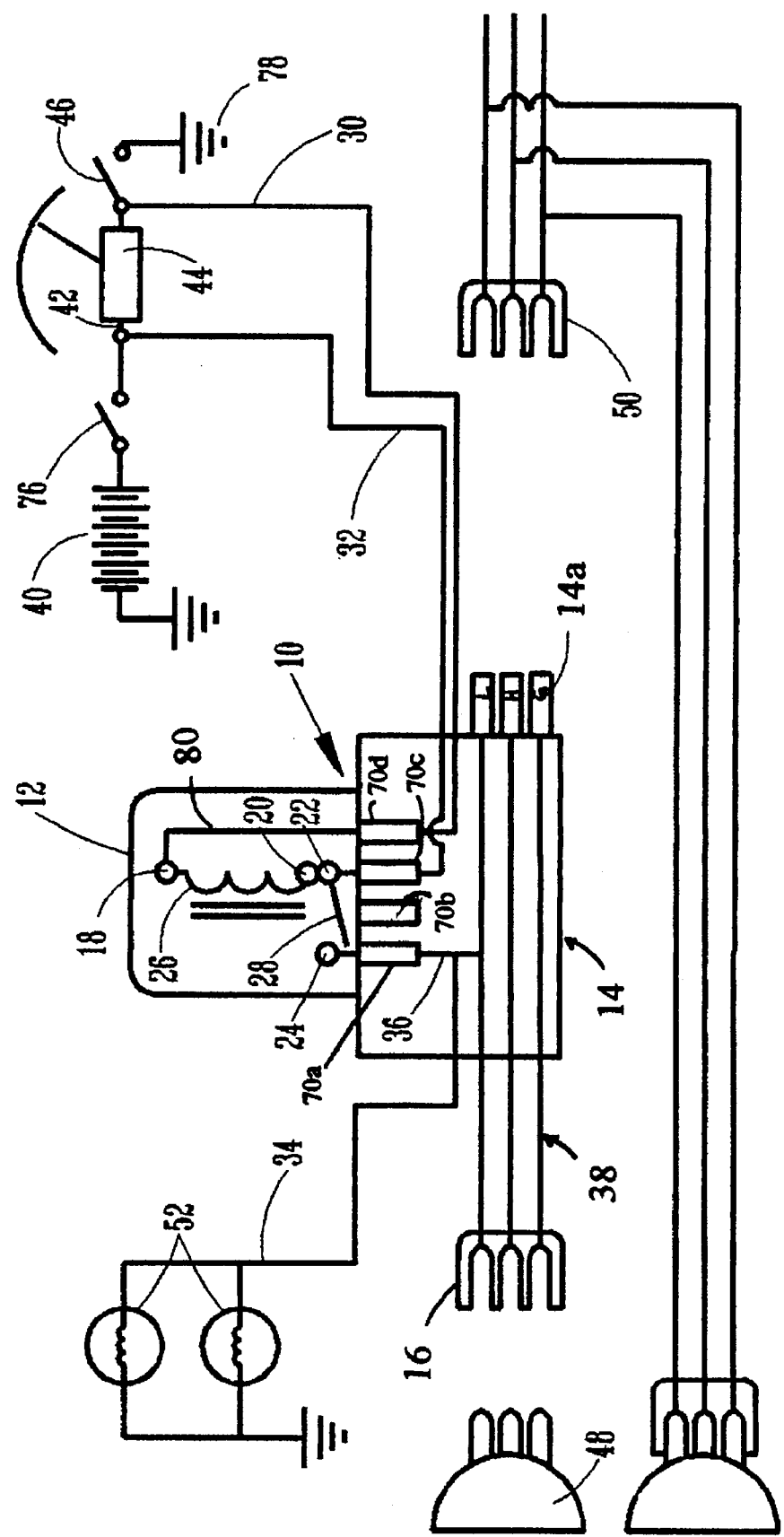
FIG. 2 is a schematic drawing depicting the safety device of the first embodiment of the present invention retrofitted into a layout of a negative type application.
Figure 3:
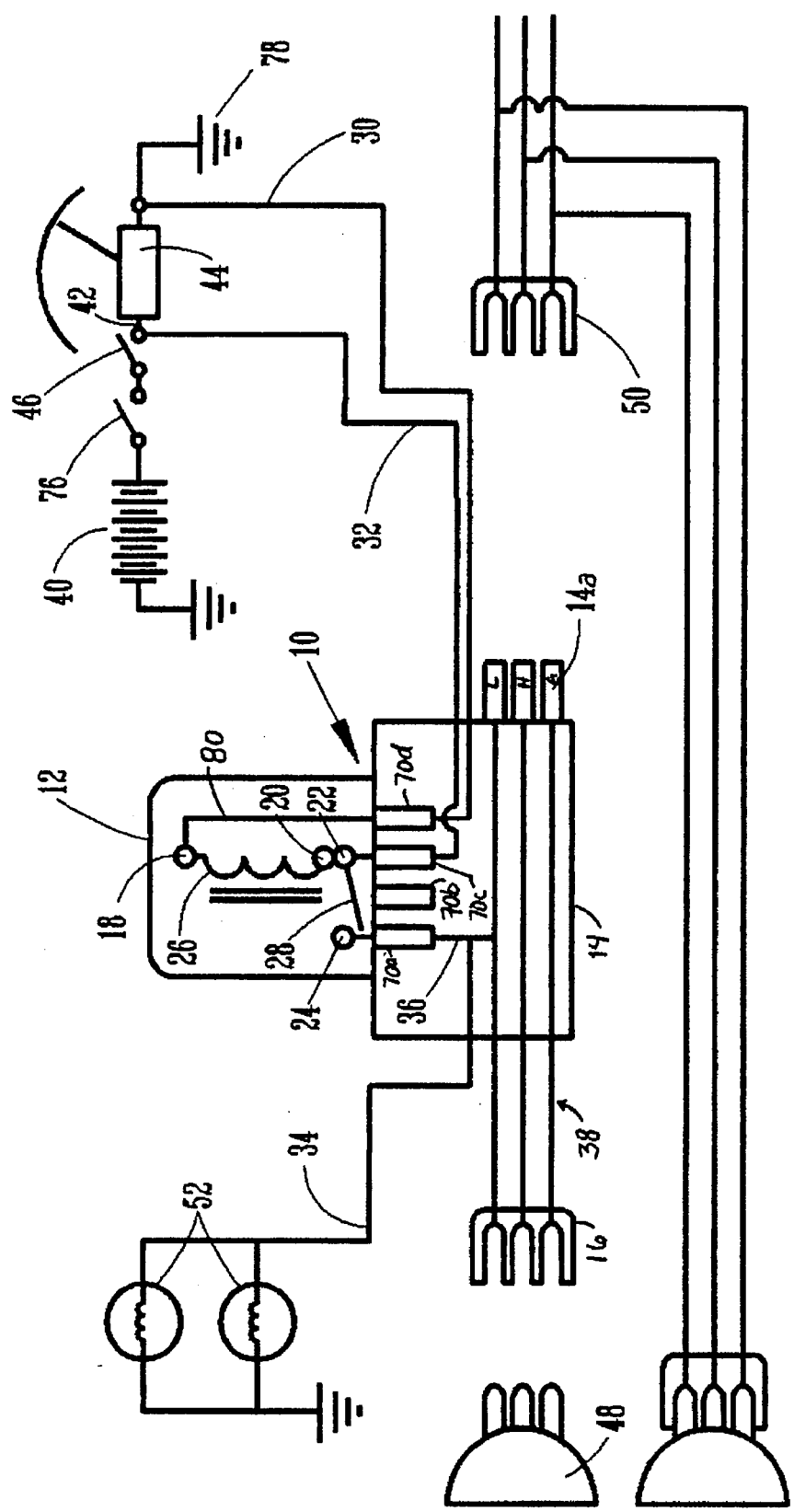
FIG. 3 is a schematic drawing depicting the safety device of the first embodiment of the present invention retrofitted into a layout of a positive type application.

Embodiments of the present invention will now be described below with reference to the accompanying drawings. As illustrated in FIG. 1, the perspective view of the present invention, the safety device 10 includes a molded relay 12. It is noted that the term molded relay means a relay that is permanently located within a housing. The safety device 10 is adapted to be removably secured into the existing plug assembly of a conventional lighting assembly. In order to provide for this means of removably attaching the device 10 into an existing light source, the device further includes a male plug assembly 14 and a female plug assembly 16, to provide for the molded relay 12 to be electrically connected to the male plug assembly 14 as well as being electrically connected to the female plug assembly 16. It is noted that the female plug assembly 16 can be integral with the male plug assembly (not illustrated) to provide for the male prongs 14a to extend from one end of the assembly and for female receiving means to exists oppositely from the male prongs 14a. Connecting the female receiving end of the female plug assembly 16 to the male extending end 14a is circuit line or wiring line 38. As illustrated in this figure, this circuit line or wiring line 38 that extend outwardly from the male plug assembly. This is to provide for an easy attachment of the safety device to an existing automotive lighting system. This circuit or wiring line 38 extending outwardly from the male plug assembly 14 provides an additional length to the safety device, hence making an easier means of attaching and retrofitting the safety device to the automotive lighting system. This added length to the circuit or wiring line 38 is optional and merely provides a means of permitting attaching the safety device 10 when the existing plug and wiring for the taillights are located in an awkward area. Additionally, as illustrated in FIGS. 2 and 3, the circuit line 38 actually includes three lines. A first line is for high beams, a second line is low beams, and a third line is ground.

It is noted that the molded relay can be designed to be permanently attached or adapted to be removably secured to the male plug assembly 14. To provide for the molded relay to be removably attached, a plurality of male metal prongs (70a–70d) are attached on the relay's lower surface. The top surface of the male plug assembly 14 would be altered to included a female receiving means adapted to receive the male prongs 70a–70d.

Figure 5:
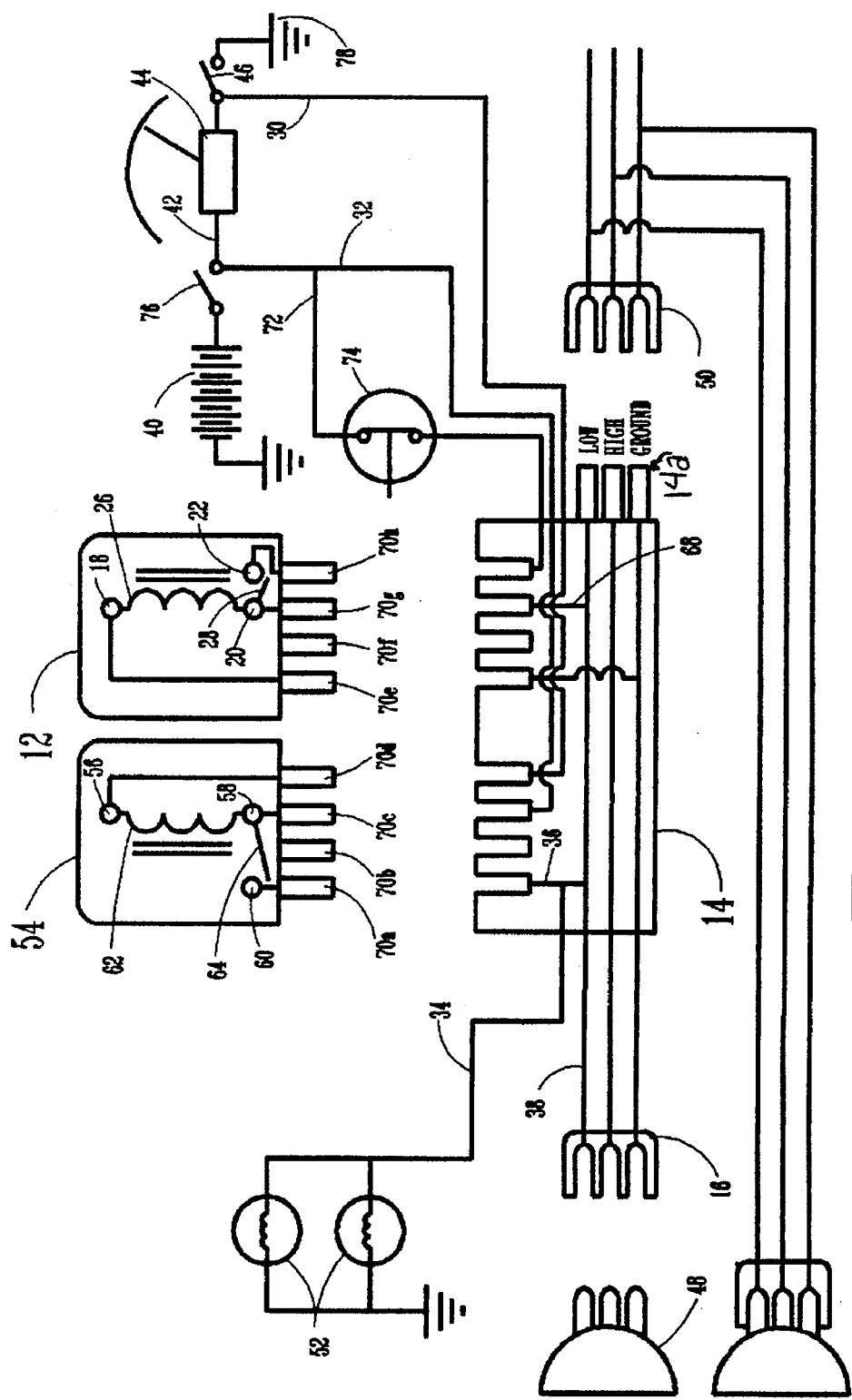
FIG. 5 is a schematic drawing depicting the safety device of the second embodiment of the present invention retrofitted into a layout of a negative type application.
Figure 6:
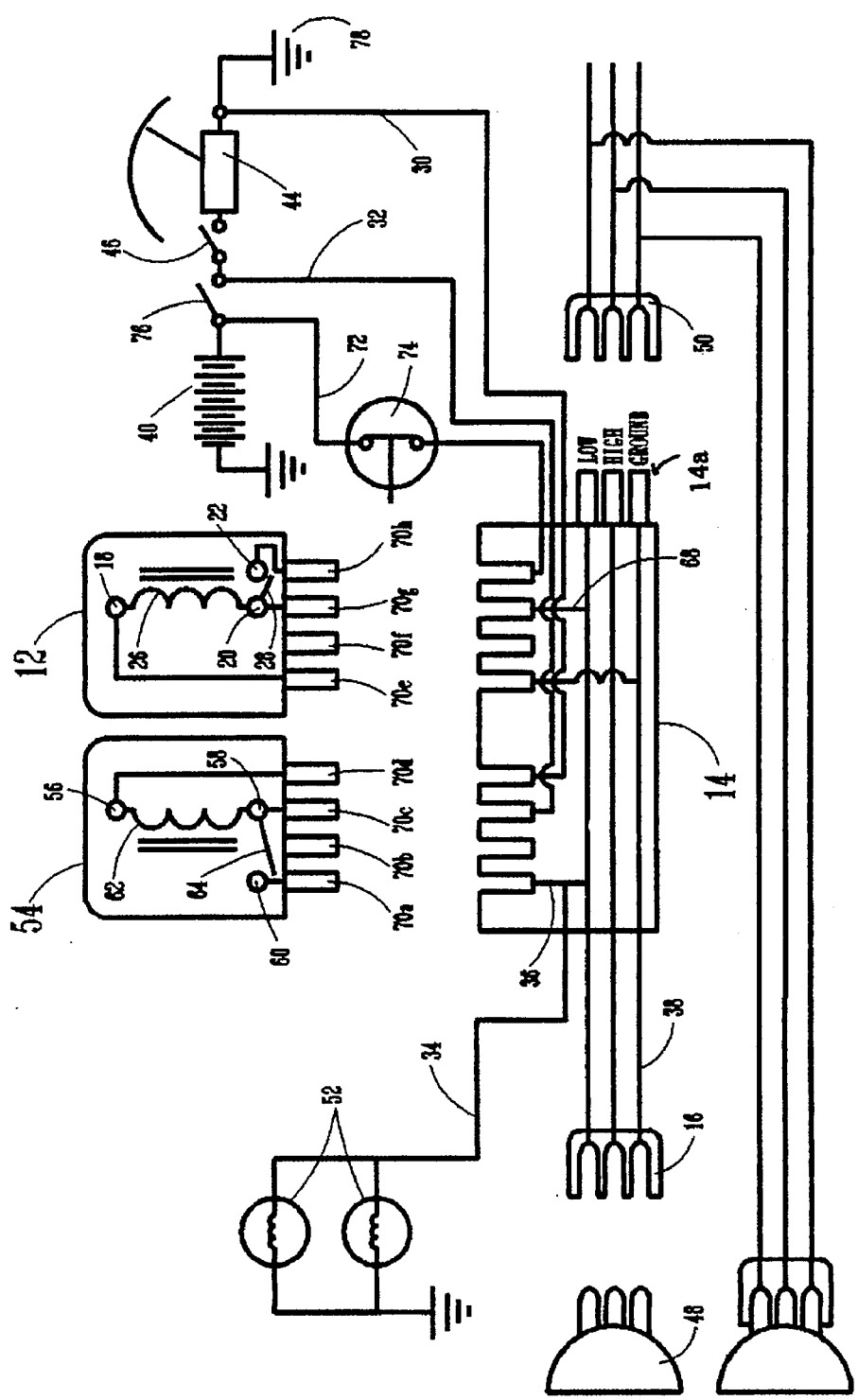
FIG. 6 is a schematic drawing depicting the safety device of the second embodiment of the present invention retrofitted into a layout of a positive type application.

FIGS. 1–3 illustrate the first embodiment of the present invention. As seen in these figures the molded relay 12 further includes a four node circuit having a first node 18, a second node 20, a third node 22, and a fourth node 24. A first coil 26 is located between the first node 18 and the second node 20. A first switch 28 is located between the third node 22 and the fourth node 24. The second node 20 is electrically connected to the third node 22. It is noted that this relay device can be decreased to a three node circuit by merely combining the second and third nodes. An example of this reduction of nodes is illustrated in FIGS. 5 and 6.

The safety device 10 of the present invention, as illustrated in FIGS. 1–3, also includes a first circuit line 30 and a second circuit line 32 that extend outwardly from the male plug assembly 14. The first circuit line 30 is electrically connected to the first node 18 of the relay via a metal prong 70d and a first connecting circuit line 80. The second circuit line 32 is connected to the third node 22 via a metal prong 70c and a second connecting circuit line (not labeled). A third circuit line 34 extends outwardly from the male plug assembly 14. In FIG. 1 this circuit line 34 extends from the female plug assembly 16. This is designed and configured to provide for the third circuit line to be easily coupled to the taillights of a motor vehicle. However, the location of this third circuit line 34 is such that it must be in electrical communication with the switch of the molded relay. For FIG. 1 this circuit line 34 must be coupled to line 38. In FIGS. 2 and 3 this third circuit line 34 is coupled to a fourth circuit line 36, which is coupled to the switch 28. It is noted that in FIGS. 2 and 3, this third circuit line 34 could have been coupled to line 38, located internally in the male plug assembly 14.

This fourth circuit line 36 is coupled to the switch 28 via a first male metal prong 70a and a third connecting circuit line (not labeled). Line 36 is also coupled to line 38. Please note that line 38 actually consists of three lines. A top line, a middle line, and a lower line. These lines correspond to low beam L, high beam H, and ground G.

The safety device 10 is adapted to be inserted into an existing lighting system of a motor vehicle. The existing motor vehicle for a negative type application (i.e. typical electrical lay out that are used in General Motor vehicles) is illustrated in FIG. 2. As seen in this figure, the circuitry for a negative type application includes a battery 40 that is coupled to the ignition switch 76. The ignition switch 76 is connected to the windshield wiper motor 44 via an electrical line 42. This windshield wiper motor 44 is connected to a windshield wiper switch 46. This windshield wiper switch is connected to a ground 78. The battery 40 is also coupled to a ground (illustrated but not labeled).

In order to insert and retrofit this device 10 to a conventional lighting system of the negative electrical lay out application of a motor vehicle, the headlight 48 located for the driver's side (passenger's side illustrated but not labeled) is unplug from an existing light plug 50. The safety device is inserted therebetween to enable the female plug assembly 16 to receive the male connecting means of the headlight 48. The existing plug 50 receives the male extending end 14a of the safety device. The first circuit line 30 is connected to the windshield wiper switch 46. This connection is made such that if the switch is closed the circuit is grounded. If the switch 46 is opened, then the circuit is not grounded and thereby creating an incomplete or opened circuit. The circuit is complete once the windshield wiper switch 46 is closed and grounded.

The second circuit line 32 is then connected to the electrical line 42 located between the ignition 76 and windshield wiper motor 44. The finale connection is to connect the third circuit line 34 to the taillights 52. As illustrated in FIG. 2, the taillights are connected to ground (illustrated but not labeled).

Utilization of the safety device for the negative type application occurs once the windshield wiper switch 46 is closed (turned on or activated). This will provide for the windshield wiper motor 44 to be energized and enable an electrical current to be supplied to the first node 18 via the first circuit line 30. This current causes a magnetic field to be induced between the first and second nodes (18 and 20 respectively), causing the switch 28, located between the third and fourth nodes, to close. This will permit for the current to travel from metal prong 70a to fourth line 36 and then to the third circuit line 34 in order to activate the taillights. The current is supplied to the headlights via the fourth circuit line 36 and line 38, hence activating the headlights.

The headlight on the passenger's side is activated once the windshield wiper switch is activated. Current also travels via line 38 to the existing wiring for the headlight on the passenger's side.

The safety device 10 is also adapted to be inserted into an existing lighting system of a positive type application (i.e. typical electrical lay out that are used in Ford vehicles) of a motor vehicle. This device can be retrofitted into the positive type application and is illustrated in FIG. 3. As seen in this figure, the circuitry for a positive type application includes a battery 40 that is coupled to an ignition switch 76. The ignition switch 76 is coupled to the windshield wiper switch 46. This switch is connected to the windshield wiper motor 44 via line 42. The battery 40 is coupled to a ground (illustrated but not labeled).

In order to insert the device to a conventional lighting system of the positive type electrical lay out of a motor vehicle, the headlight 48 on the driver's side is unplug from an existing light plug 50. It is noted that the headlight on passenger's side (illustrated, but not labeled) does not need to be unplugged. The safety device is inserted therebetween to enable the female plug assembly 16 to receive the male connecting means (illustrated but not labeled) of the headlight 48. The existing plug 50 is adapted to receive the male plug extending end of the male plug assembly 14 of the safety device. The first circuit line 30 is connected in series to the windshield wiper motor 44. This first circuit line 30 is connected to a ground 78. The second circuit line 32 is then connected to an electrical line 42 located between the windshield wiper switch 46 and windshield wiper motor 44. This will provide for the second circuit line 32 to be coupled between the windshield wiper switch and windshield wiper motor. The finale connection is to connect the third circuit line 34 to the taillights 52. As illustrated in FIG. 3, the taillights are connected to ground (illustrated but not labeled).

Utilization of the safety device occurs once the windshield wiper switch 46 is closed (turned on or activated). This will provide for the windshield wiper motor 44 to be energized and enable an electrical current to be supplied to the first node 18 via the first circuit line 30, metal prong 70d, and line 80. This current causes a magnetic field to be induced between the first and second nodes (18 and 20 respectively), causing the switch 28, located between the third and fourth nodes, to close. This will permit for the current to travel via metal prong 70a, to line 36, and to the third circuit line 34 in order to activate the taillights.

The current is supplied to the headlight via the fourth circuit line 36 and line 38, thereby activating the headlights.

The headlight on the passenger's side is activated once the windshield wiper switch is activated. Current also travels via line 38 to the existing wiring for the headlight on the passenger's side.

The first embodiment of the present invention is designed such that if the ignition switch is deactivated, then the lights will automatically be turned off. It is noted that this first embodiment of the present invention illustrates the molded relay that is adapted to be removably secured to the male plug assembly. However, this device can be designed so that the relay is permanently attached to the male plug assembly. In order to do this then the male prongs and the connecting lines could be eliminated, so that the first, second, and fourth circuit lines would be coupled to the appropriate node.

Figure 4:
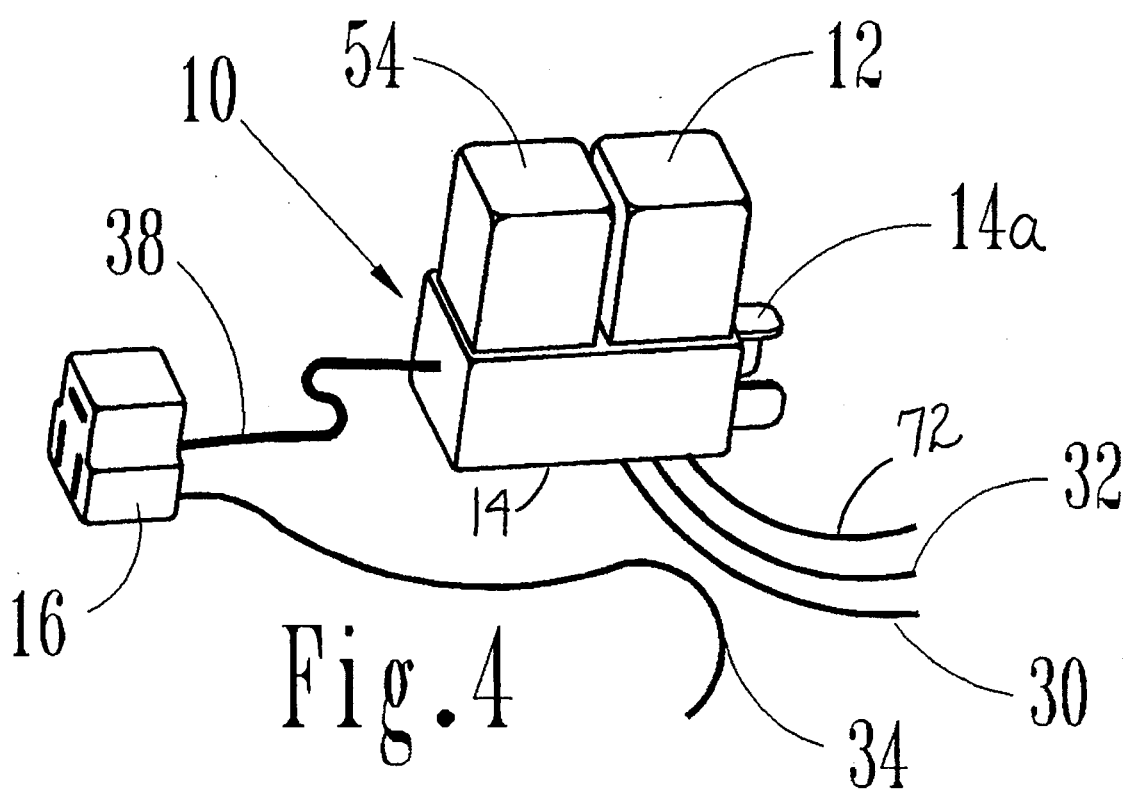
FIG. 4 is a perspective view of the second embodiment of the safety device of the present invention.

The above described embodiments can be altered to include an added safety feature. This safety feature is a second relay that is located parallel to the first relay. The use of two relays will permit for the lights to remain activated even if the windshield wipers are switched off. An additional switch is also provided to enable the user to switch off the lights once the windshield wipers are deactivated. Various views of this second embodiment is illustrated in FIGS. 4, 5, and 6. As seen in these figures the safety device 10 includes a first molded relay 12 and a second molded relay 54. It is the first molded relay which maintains the headlights 48 and taillight 52 activated if the windshield wipers are deactivated.

This device is adapted to be removably secured into the existing plug of a conventional headlight assembly. In order to provide for this means of removably attaching the device 10 into an existing light source, the device further includes a male plug assembly 14 and a female plug assembly 16. The molded relays 12 and 54 are electrically connected to the male plug and female plug assemblies (14 and 16 respectively). It is noted that the female plug assembly 16 can be integral with the male plug assembly. For easy attachment of the safety device to an existing automotive lighting system, the circuit line 38 can be extended to provide for line 38 to extend outwardly from the male plug assembly. This extension of circuit line 38 provides an additional length and flexibility for the female plug assembly of the safety device, hence making an easier means of attaching and retrofitting the safety device to the automotive lighting system. It is noted that the first and second molded relays can be designed to be removably secured to the plug (as illustrated in these figures) or to be permanently attached to the plug. To provide for the removable securement, the first and second relays include male metal prongs 70a–70h. The male plug assembly 14 includes female receiving means (illustrated, but not labeled) that are adapted to receive the male metal prongs.

The first molded relay 12 includes a three node circuit having a first node 18, a second node 20, and a third node 22. A first coil 26 is located between the first node 18 and the second node 20. A first switch 28 is located between the second node 20 and third node 22.

The second molded relay 54 includes a three node circuit having a first node 56, a second node 58, and a third node 60. A second coil 62 is located between the first node 56 and the second node 58. A second switch 64 is located between the second node 58 and the third node 60.

The safety device also includes a first circuit line 30 and a second circuit line 32 that extend outwardly from the safety device of the present invention. The first circuit line 30 is connected to the first node 56 of the second molded relay 54. The second circuit line 32 is connected to the second node 58 of the second molded relay 54. A third circuit line 34 extends outwardly from the safety device. A fourth circuit line 36 is coupled to the third circuit line 34.

The fourth circuit line 36 is coupled to the third node 60 of the second relay 54 and also to line 38. A fifth circuit line 68 is coupled to line 38 and also to second node 20 of the first relay 12. This will provide for an electrical connection to be made from node 60 of the second relay 54 to second node 20 via the lines 36, 38, and 68. This male plug assembly 14 is adapted to be insertable into the existing plug 50 for the headlight on the driver's side for the lighting system of the vehicle. The headlight for the passenger side does not need to be unplugged.

A sixth circuit line 72 extends outwardly from the plug 14. This sixth circuit line is adapted to be electrically connected to the third node 22 of the first relay (contacts metal prong 70h). This sixth circuit line also includes a switch 74.

Connecting the female receiving end of the female plug assembly 16 to the male extending end 14a is circuit line 38. It is noted that the circuit line 38 actually illustrates three lines. These lines correspond to low beam, high beam and ground. The top two lines being the low and high. Node 18 is connected to ground.

The safety device is adapted to be inserted into an existing lighting system of a motor vehicle. The existing motor vehicle for a negative type application (i.e. typical electrical lay out that are used in General Motor vehicles) is illustrated in FIG. 5 and includes a battery 40 that is coupled to an ignition switch 76. This switch is coupled to a windshield wiper motor 44 via an electrical line 42. The windshield wiper motor 44 is connected to a windshield wiper switch 46. This windshield wiper switch is connected to a ground 78. The battery 40 is also coupled to a ground (illustrated but not labeled).

In order to insert the device to a conventional lighting system of the negative electrical lay out of a motor vehicle, the male metal prongs 70a–70h of the first and second molded relays 12 and 54 are inserted into the first and second female receiving ends, respectively, of the male plug assembly 14. This step can be eliminated if the molded relays 12 and 54 are permanently attached to the male plug assembly 14. After the molded relays 12 and 54 are attached (electrically and mechanically) to the male plug assembly, the conventional headlight is unplugged from an existing light plug 50. Please note that only the headlight located on the driver's side is unplugged. The headlight on the passenger's is not unplugged. The safety device is inserted therebetween to enable the female plug 16 to receive the male connecting means of the headlight 48. The existing plug 50 receives the male plug assembly 14 of the safety device. The first circuit line 30 is connected between the windshield wiper switch 46 and windshield wiper motor 44. The second circuit line 32 is then connected to the electrical line 42 located between the ignition switch 76 and windshield wiper motor 44. A third connection is made to connect the third circuit line 34 to the taillights 52. As illustrated in FIG. 5, the taillights are connected to ground (illustrated but not labeled).

The purpose of the second relay is to maintain the headlights and taillights activated if the windshield wiper switch is opened (deactivated). If the maintenance of the headlights and taillights is not desired, then switch (push button) 74, located on the sixth circuit line 72 is activated to an opened position. This will not permit current to be supplied to the second molded relay.

Utilization of the safety device occurs once the windshield wiper switch 46 is closed (turned on or activated). This will provide for the windshield wiper motor 44 to be energized and enable an electrical current to be supplied to the first node 56 of the second relay 54 via line 30. In this figure, the current will travel to the first node 56 via line 30, a metal prong 70d and a circuit line (illustrated and not labeled). This current causes a magnetic field to be induced between the first and second nodes (56 and 58 respectively), causing the second switch 64, located between the second and third nodes to close. This will permit for the current to travel from the third node 60 to the first relay 12. This current from the third node exists the first relay 54 to the fourth circuit line 36 and travels so as to enter the first relay 12 via line 38 to a fifth line 68 into the first relay at the second node 20. This current causes a magnetic field to be induced between the first and second nodes (18 and 20 respectively), causing the first switch 28, located between the second and third nodes to close. This will permit for the current to travel from the third node to the male plug assembly 14 to a sixth circuit line. It is this sixth circuit line 72 that includes a deactivation switch 74 which will permit the user to switch off the headlights 48 and taillights 52 after the windshield wipers have been deactivated (switch off). This button, once opened will not enable current to be supplied to the molded relays.

Current also is transmitted from the fourth line 36 to the female plug via lines 38 in order to energize the headlight 48 and taillights 52.

The headlight on the passenger's side is activated once the windshield wiper switch is activated. Current also travels via line 38 to the existing wiring for the headlight on the passenger's side.

The lights are deactivated once the ignition switch is deactivate.

The safety device 10 of the second embodiment is also adapted to be inserted into an existing lighting system of a positive type application (i.e. typical electrical lay that are used in Ford vehicles) of a motor vehicle. This device can be retrofitted into a positive type application and is illustrated in FIG. 6. As seen in this figure, the circuitry for a positive type application includes a battery 40 that is coupled to an ignition switch 76. The ignition switch is coupled to a connecting line 42. The connecting line is connected to a windshield wiper switch 46. This switch is coupled to a windshield wiper motor 44. The battery 40 is coupled to a ground (illustrated but not labeled).

In order to insert the device to a conventional lighting system of the positive type electrical lay out of a motor vehicle, the headlight located on the driver's side 48 is unplug from an existing light plug 50. The passenger side does not need to be unplugged. The safety device is inserted therebetween to enable the female plug assembly 16 to receive the male connecting means of the headlight 48. The existing plug 50 receives the male plug assembly 14 of the safety device. The first circuit line 30 is connected between the windshield wiper switch and the windshield wiper motor 44. This first circuit line 30 is coupled to a ground (illustrate but not labeled). The second circuit line 32 is then connected to an electrical line 42 which is coupled to the windshield wiper switch 46. The finale connection is to connect the third circuit line 34 to the taillights 52. As illustrated in FIG. 6, the taillights are connected to ground (illustrated but not labeled).

Utilization of the safety device occurs once the windshield wiper switch 46 is closed (turned on or activated). This will provide for the windshield wiper motor 44 to be energized and enable an electrical current to be supplied to the first node 56 of the second relay 54 via line 30. In this figure, the current will travel to the first node 56 via line 30, a metal prong 70d and a circuit line (illustrated and not labeled). This current causes a magnetic field to be induced between the first and second nodes (56 and 58 respectively), causing the second switch 64, located between the second and third nodes to close. This will permit for the current to travel from the third node 60 to the first relay 12. This current from the third node exists the first relay 54 to the fourth circuit line 36 and travels so as to enter the first relay 12 via a line 38 to a sixth line 68 into the first relay at the second node 20. This current causes a magnetic field to be induced between the first and second nodes (18 and 20 respectively), causing the first switch 28, located between the second and third nodes to close. This will permit for the current to travel from the third node to the male relay 14 to a sixth circuit line 72. It is this sixth circuit line 72 that includes a deactivation switch 74 which permit the user to switch off the headlights 48 and taillights 52 after the windshield wipers have been turned off. Once pushed, current will not be supplied to the safety relays.

Current also is transmitted from the fourth line 36 to the female plug assembly via line 38 in order to energize the headlight 48 and taillights 52.

The headlight on the passenger's side is activated once the windshield wiper switch is activated. Current also travels via line 38 to the existing wiring for the headlight on the passenger's side.

The lights are deactivated once the ignition switch is deactivated.

The headlight on the passenger's side is activated once the windshield wiper switch is activated. Current also travels via line 38 to the existing wiring for the headlight on the passenger's side.

In all the embodiments (FIGS. 1–6) if the lights (taillights and headlights) are not deactivated by the user, then the lights will inherently be switch off by way of the deactivation the ignition switch (forming an open circuit). This is due to the fact that no current is entering the first relay (first embodiment) or second relay (second embodiment), thereby prohibiting a magnetic field to exists, and not forming any closed circuits.

In halogen type headlight bulb assembly, there is required a different type of male extending and female receiving ends for the safety device of the present invention. To accommodate the halogen type socket, the male extending and female receiving ends are merely altered while the wiring remains the same.

While the invention has been particularly shown and described with reference to an embodiment thereof, it will be understood by those skilled in the art, that various changes in form and detail may be made without departing from the spirit and scope of the invention.

I claim:

1. A safety device that is adapted to be connected with taillights, headlights, a windshield wiper motor, and a windshield wiper switch of a motor vehicle comprising in combination:

a first molded relay housing a first coil coupled to a first switch;

a male plug assembly is connected to said first molded relay;

said male plug assembly having first male extending means;

a female plug assembly having first female receiving means and is electrically and mechanically connected to said male plug assembly via a first wiring line;

a first circuit line has a first end that extends outwardly from said male plug assembly and a second end of said first circuit line is in electrical communication with a first end of said coil;

a second circuit line has a first end that extends outwardly from said male plug assembly and a second end of said second circuit line is in electrical communication with a second end of said coil via a second electrical communication means;

a third circuit line has a first end that extends outwardly from said male plug assembly or said female plug assembly and a second end of said third circuit line is coupled to a fourth circuit line;

said fourth circuit line has a first end that is coupled to said third circuit line and a second end of said fourth circuit line is coupled to said switch for enabling current to flow through said fourth circuit line when said switch is closed;

said male extending means is electrically connected to said fourth circuit line; and wherein said safety device is adapted to be inserted into said motor vehicle by enabling said first circuit line to be connected to a windshield wiper motor or said windshield wiper switch such that said windshield wiper switch is grounded when said windshield wiper switch is closed, said second circuit line is adapted to be connected in series with an ignition switch, said third circuit line is adapted to be connected to said taillights, said female plug assemble is adapted to receive a male end of a driver's side headlight, said male plug assembly is adapted to receive a conventional plug of said driver's side headlight of said motor vehicle, and said headlights and said taillights will be activated once said windshield wiper switch is activated.

2. A safety device as in claim 1 wherein said first molded relay is adapted to be removably secured to said male plug assembly via an attaching means.

3. A safety device as in claim 2 wherein said attaching means includes a second female receiving means located in said male plug assembly and said first molded relay includes a first set of metal prongs, and said first set of metal prongs includes at least a first male prong, a second male prong, and a third male prong, and said first set of metal prongs are adapted to be removably insertable into said second female receiving means.

4. A safety device as in claim 1 wherein said safety device further includes a second molded relay and said second molded relay is attached to said male plug assembly;

said second molded relay includes a fourth node, a fifth node, and a sixth node;

a second coil is located between said fourth node and said fifth node;

a second switch is located between said fifth node and said sixth node;

a fifth circuit line has a first end that is coupled to said first wiring line and said fifth circuit line has a second end that is in electrical communication to said fifth node via a fourth electrical communication means; and a sixth circuit line has a first end that is coupled to said second circuit line and said sixth circuit line has a second end that is in electrical communication to said sixth node of said second relay via a fifth electrical communication means; and a seventh circuit line has a first end that is coupled to said ground line and a second end of said seventh circuit line is electrically connected to said fourth node via a sixth electrical communication means.

5. A safety device as in claim 4 wherein said first molded relay and said second molded relay are adapted to be removably secured to said male plug assembly via an attaching means.

6. A safety device as in claim 4 wherein said sixth circuit line further includes a third switch.

7. A safety device as in claim 1 wherein said safety device further includes a second molded relay and said second molded relay having a second coil coupled to a second switch is attached to said male plug assembly;

a fifth circuit line has a first end that is coupled to said first circuit line and said fifth circuit line has a second end that is in electrical communication to said second switch via a forth electrical communication means for enabling current to flow through said fifth circuit line when said second switch is closed;

a sixth circuit line has a first end that is coupled to said fourth circuit line and said sixth circuit line has a second end that is in electrical communication to said second via a fifth electrical communication means; and a seventh circuit line has a first end that is coupled to a ground line and a second end of said seventh circuit line is electrical connect to said second coil via a sixth electrical communication means.

8. A safety device as in claim 7 wherein said sixth circuit line further includes a third switch.

9. A safety device that is adapted to be connected with taillights, headlights, a windshield wiper motor, and a windshield wiper switch of a motor vehicle comprising in combination:

a first molded relay having a first coil coupled to a first switch;

a male plug assembly is connected to said first molded relay;

a female plug assembly including a female receiving end is connected to said male plug assembly;

a first wiring line extends from said female receiving end to said male extending end:

a first circuit line has a first end that extends outwardly from said male plug assembly and a second end of said first circuit line is coupled to a first end of said coil;

a second circuit line has a first end that extends outwardly from said male plug assembly and a second end of said second circuit line is coupled to a second end of said coil;

a third circuit line has a first end that extends outwardly from said male plug assembly or female plug assembly and a second end of said third circuit line is coupled to a fourth circuit line;

said fourth circuit line has a first end that is coupled to said first wiring line and a second end of said fourth circuit line is coupled to said switch for enabling current to flow through said fourth circuit line when said switch is closed;

said male extending means is in electrical communication with said fourth circuit line; and said safety device is adapted to be inserted into said motor vehicle by enabling said first circuit line to be connected to a windshield wiper motor or between said windshield wiper switch and said windshield wiper motor such that said windshield wiper switch is grounded when said windshield wiper switch is closed, said second circuit line is adapted to be connected in series with an ignition switch, said third circuit line is adapted to be connected to said taillights, said female plug assembly is adapted to receive a male end of a driver's side headlight, said male plug assembly is adapted to receive a conventional plug of said driver's side headlight of said motor vehicle, and said headlights and said taillights will be activated once said windshield wiper switch is activated.

10. A safety device as in claim 9 wherein said safety device further includes a second molded relay having a second coil coupled to a second switch and said second molded relay is attached to said male plug assembly;

a fifth circuit line has a first end that is coupled to said first circuit line and said fifth circuit line has a second end that is coupled to said second switch for enabling current to flow through said fifth circuit line when said second switch is closed;

a sixth circuit line has a first end that is coupled to said fourth circuit line and said sixth circuit line has a second end that is coupled to said said second switch; and a seventh circuit line has a first end that is coupled to said ground line and a second end of said seventh circuit line is coupled to said said second coil.

11. A safety device as in claim 10 wherein said sixth circuit line further includes a third switch.

12. A safety device that is adapted to be connected with taillights, headlights, a windshield wiper motor, and a windshield wiper switch of a motor vehicle comprising in combination:

a first molded relay having a first coil coupled to a first switch;

a male plug assembly is connected to said first molded relay;

said male plug assembly includes a first male extending means;

a first end of a first wiring line is coupled to said first male extending end and a second end of said first wiring line extends outwardly from said male plug assembly;

a first end of a ground line is coupled to said first male extending end and a second end of said ground line extends outwardly from said male plug assembly;

a female plug assembly includes a first female receiving means;

said first female receiving means is coupled to said second end of said ground line and said first female receiving means is coupled to said second end of said first wiring line;

a first circuit line has a first end that extends outwardly from said male plug assembly and a second end of said first circuit line is coupled to a first end of said first coil;

a second circuit line has a first end that extends outwardly from said male plug assembly and a second end of said second circuit line is coupled to a second end of said first coil; a third circuit line has a first end that extends outwardly from said male plug assembly or female plug assembly and a second end of said third circuit line is coupled to a fourth circuit line;

said fourth circuit line has a first end that is coupled to said third circuit line and a second end of said fourth circuit line is coupled to said first switch for enabling current to flow through said fourth circuit line when said switch is closed;

said male extending means is in electrical communication to said fourth circuit line;

said safety device is adapted to be inserted into said motor vehicle by enabling said first circuit line to be connected to a windshield wiper motor or between said windshield wiper switch and said windshield wiper motor such that said windshield wiper switch is grounded when said windshield wiper switch is closed, said second circuit line is adapted to be connected in series with an ignition switch, said third circuit line is adapted to be connected to said taillights, said female plug assembly is adapted to receive a male end of a driver's side headlight, said male plug assembly is adapted to receive a conventional plug of said driver's side headlight of said motor vehicle, and said headlights and said taillights will be activated once said windshield wiper switch is activated.

13. A safety device as in claim 12 wherein said first molded relay is adapted to be removably secured to said male plug assembly via an attaching means.

14. A safety device as in claim 13 wherein said attaching means includes a second female receiving means located in said male plug assembly and said first molded relay includes a first set of metal prongs, and said first set of metal prongs includes at least a first male prong, a second male prong, and a third male prong, and said first set of metal prongs are adapted to be removably insertable into said second female receiving means.

15. A safety device as in claim 12 wherein said safety device further includes a second molded relay and said second molded relay having a second coil coupled to a second switch is attached to said male plug assembly;

a fifth circuit line has a first end that is coupled to said first circuit line and said fifth circuit line has a second end that is in electrical communication to said second switch via a fourth electrical communication means for enabling current to flow through said fifth circuit line when said second switch is closed;

a sixth circuit line has a first end that is coupled to said fourth circuit line and said sixth circuit line has a second end that is in electrical communication to said second switch, opposite from said fifth circuit via a fifth electrical communication means; and a seventh circuit line has a first end that is coupled to said ground line and a second end of said seventh circuit line is electrically connected to said second coil via a sixth electrical communication means.

16. A safety device as in claim 15 wherein said first molded relay and said second molded relay are adapted to be removably secured to said male plug assembly via an attaching means.

17. A safety device as in claim 16 wherein said attaching means includes a second female receiving means located in said male plug assembly and a third female receiving means located in said male plug assembly;

said first molded relay includes a first set of metal prongs, and said first set of metal prongs includes at least a first male metal prong, a second male metal prong, and a third male metal prong;

said first set of metal prongs are adapted to be removably insertable into said second female receiving means;

said second molded relay includes a second set of metal prongs, and said second set of metal prongs includes fourth male prong, a fifth male prong, and a sixth male prong; and said second set of metal prongs are adapted to be removably insertable into said third female receiving means.

\* \* \* \* \*